United States Patent [19]
Henderson

[11] 3,901,269
[45] Aug. 26, 1975

[54] JACKET CONSTRUCTION FOR FLUID FLOW FITTINGS

[75] Inventor: James R. Henderson, Charlotte, N.C.

[73] Assignee: Controls Southeast, Inc., Charlotte, N.C.

[22] Filed: Aug. 14, 1973

[21] Appl. No.: 388,182

[52] U.S. Cl. .............. 137/340; 137/375; 138/111; 165/47; 165/76; 165/169; 285/41
[51] Int. Cl. ..................... F16k 49/00; F16l 53/00
[58] Field of Search ...... 137/340, 375; 138/32, 111; 165/47, 76, 77, 136, 169; 285/41, 47

[56] References Cited
UNITED STATES PATENTS

| | | | |
|---|---|---|---|
| 1,654,544 | 1/1928 | Hulse | 165/169 X |
| 1,796,707 | 3/1931 | Engler | 165/169 X |
| 1,942,082 | 1/1934 | Biancalana | 165/47 X |
| 1,942,083 | 1/1934 | Biancalana | 165/47 X |
| 2,074,365 | 3/1937 | Clifford | 165/47 X |
| 2,452,046 | 10/1948 | Garrison et al. | 165/47 X |
| 2,629,988 | 3/1953 | Lee | 165/77 X |
| 2,707,096 | 4/1955 | Koopmans | 165/169 X |
| 2,742,268 | 4/1956 | Tarr | 165/77 X |
| 2,785,697 | 3/1957 | Sullender et al. | 137/340 |
| 3,439,910 | 4/1969 | Regelin et al. | 137/340 X |
| 3,511,262 | 5/1970 | Vietorisz | 137/340 X |
| 3,596,935 | 3/1969 | McGoech | 285/41 X |
| R19,361 | 11/1934 | Clifford | 165/77 X |

FOREIGN PATENTS OR APPLICATIONS

| | | | |
|---|---|---|---|
| 279,828 | 1929 | United Kingdom | 165/47 |
| 180,482 | 10/1935 | Switzerland | 285/47 |
| 1,240,252 | 7/1971 | United Kingdom | 138/32 |
| 535,224 | 11/1955 | Italy | 137/375 |

Primary Examiner—Alan Cohan
Assistant Examiner—Gerald A. Michalsky
Attorney, Agent, or Firm—Parrott, Bell, Seltzer, Park & Gibson

[57] ABSTRACT

To aid in maintaining at a desired temperature a fluid flowing through a fitting in a fluid conveying system, a jacket means is provided which has a hollow housing of heat-conductive material which substantially surrounds the body of the fitting and through which a temperature-controlling fluid is circulated in heat-transferring relation to the body of the fitting.

4 Claims, 30 Drawing Figures

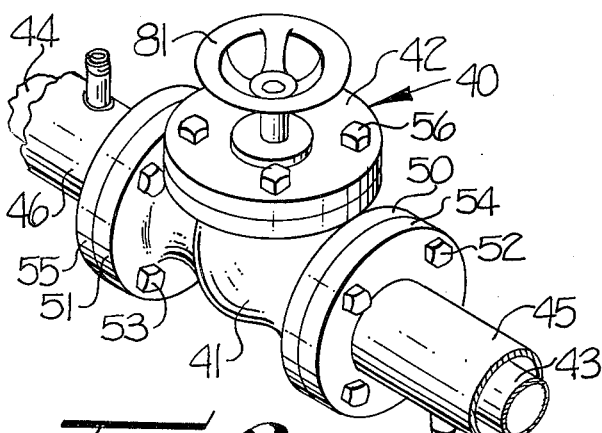
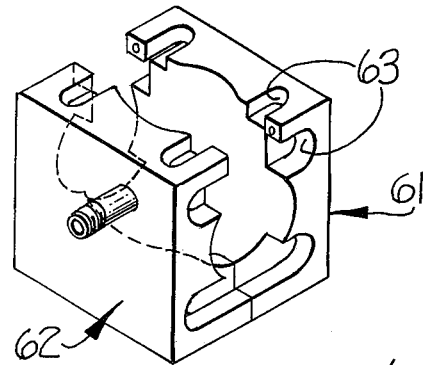
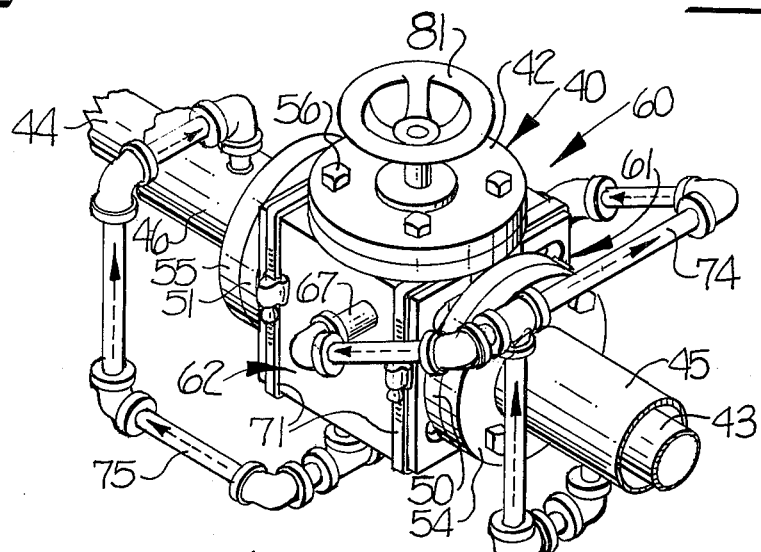
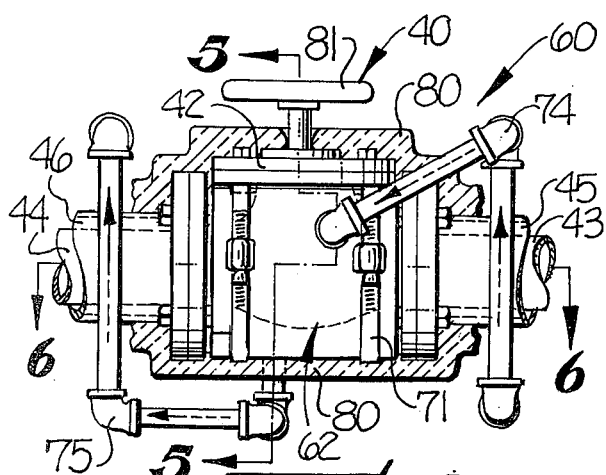
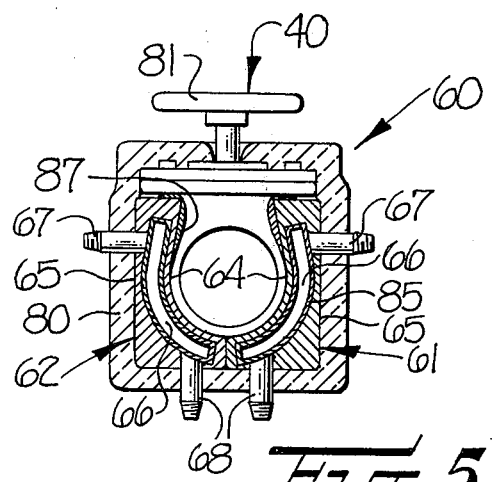

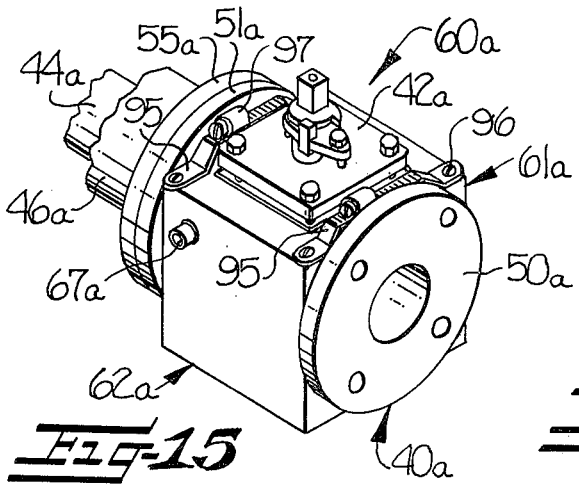
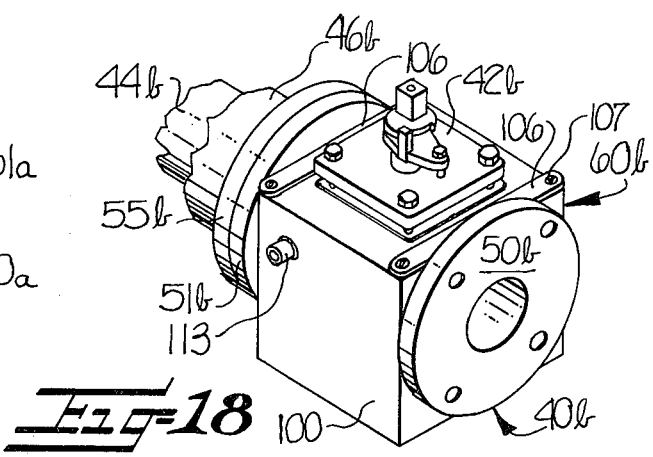
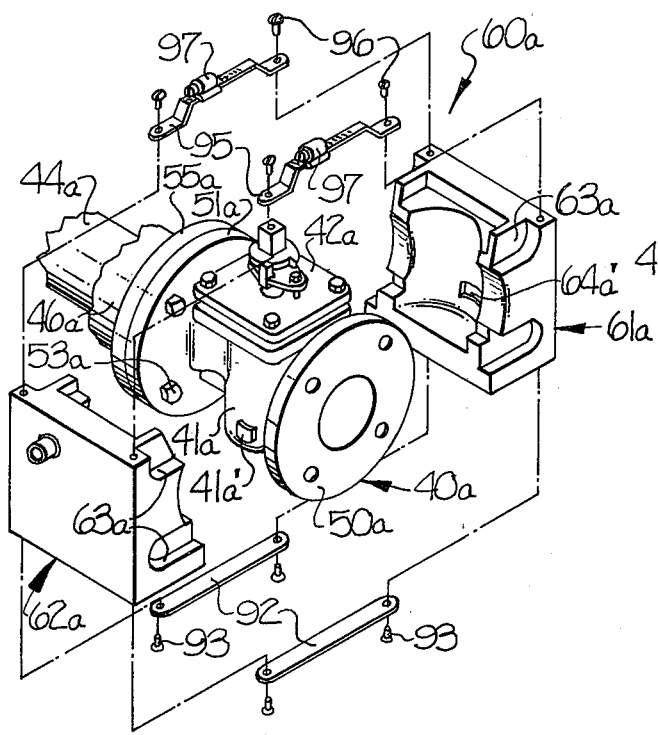
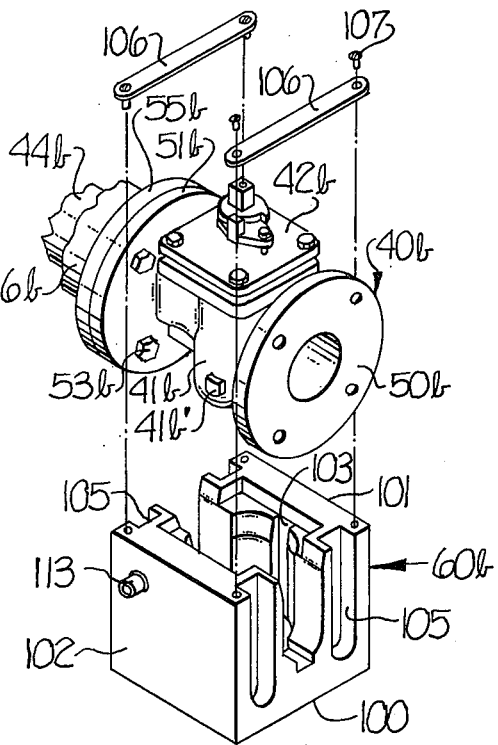
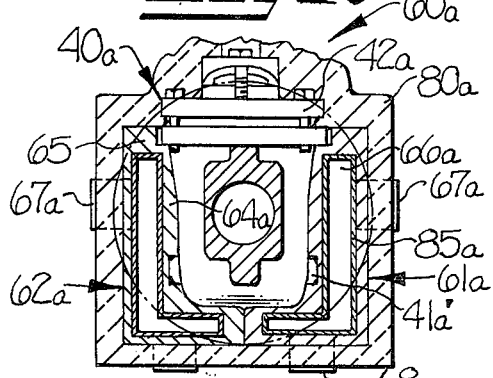
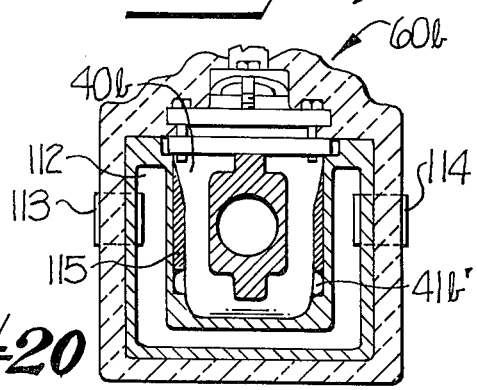

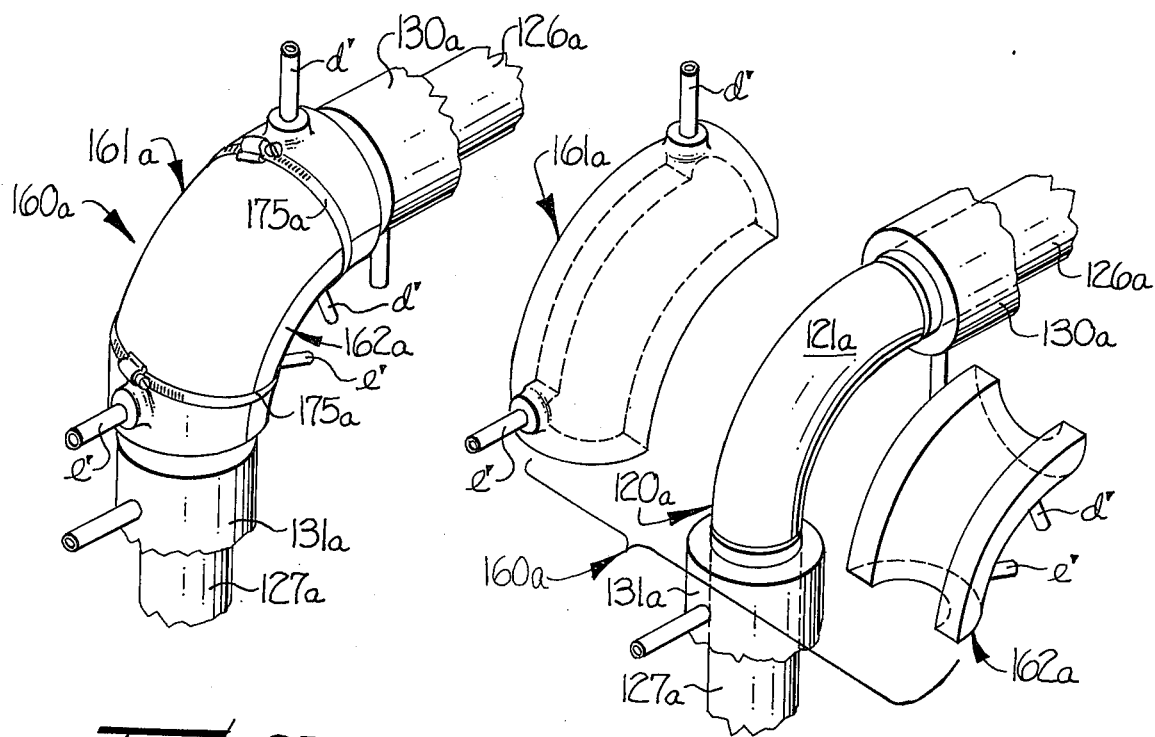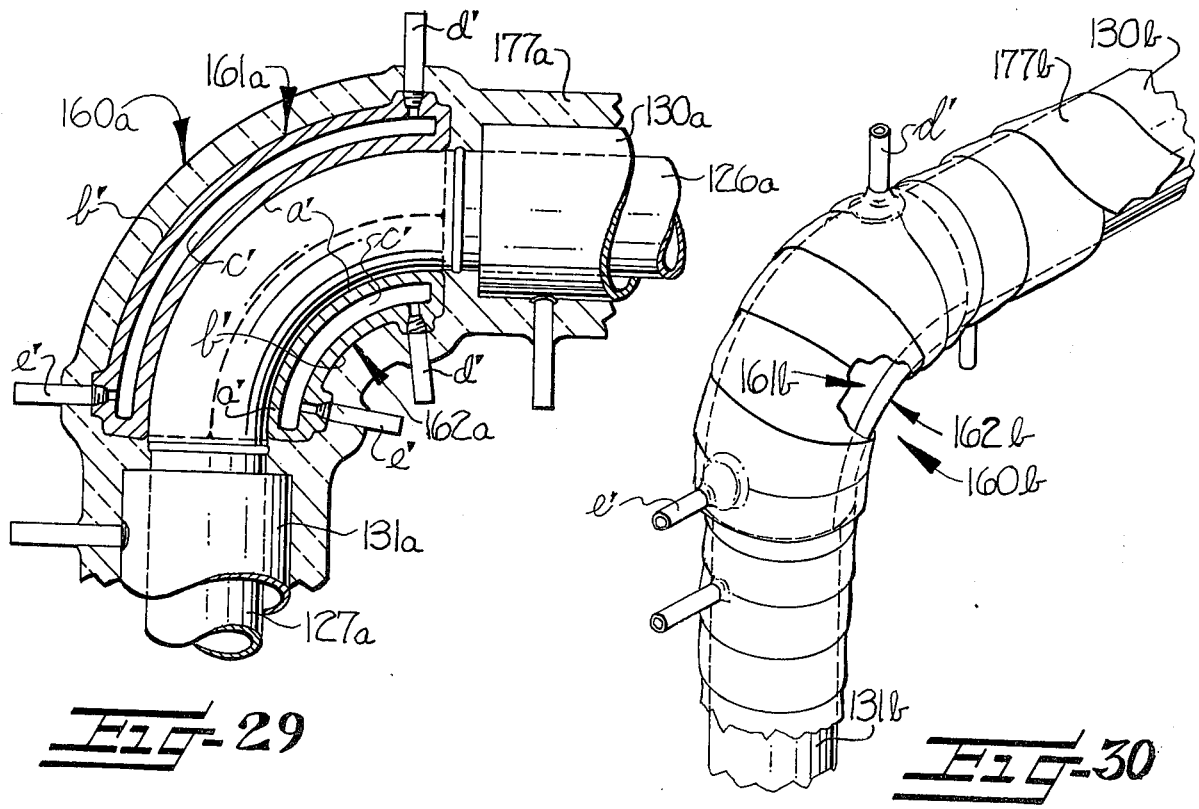

JACKET CONSTRUCTION FOR FLUID FLOW FITTINGS

This invention relates to fluid conveying systems for hot and cold fluids, and more especially to an improved jacket construction substantially surrounding a fluid flow fitting of a fluid conveying system in heat-transferring relation to the fitting and through which jacket construction a temperature-controlling fluid is circulated to aid in maintaining the fluid being conveyed at a desired optimum temperature.

Heretofore, in order to provide a steam jacket for pipe fittings, such as valves for example, it has been the customary practice to weld a wall around the valve so as to form a passageway between the welded wall and the body of the valve to permit circulating a temperature-controlling fluid, such as steam, in heat-transferring relation to the valve. Dickerson et al U.S. Pat. No. 2,900,995, granted Aug. 25, 1959, is typical of such prior practice. This prior practice has many disadvantages. Of primary importance is the attendant cost in welding such a wall around the valve, bearing in mind, as is evidenced upon a casual glance at the drawings in the Dickerson et al patent, that the welded wall is of multi-piece construction so as to be positioned in the desired close relationship to the body of the valve for forming the relatively small passageway therebetween through which the steam is circulated.

Another disadvantage of this prior practice of forming a jacket around valves is that the attendant welding can only be effected on the exterior surfaces of the jacket so that the welded seams are not as strong as would be the case if the joints were welded from both sides. Thus, these exteriorly welded seams are susceptible of rupture under the high internal pressures and temperatures to which such steam jackets are generally subjected. In this regard, for example, in the conveyance of a number of chemical materials, such as in the formation or production of synthetic textile fibers, it is not uncommon to utilize steam at a pressure of 100 to 150 pounds per square inch and at a temperature up to 375° Fahrenheit in order to prevent undesirable heat loss and interference with the flow of the material. Thus, it is important that the steam jacket surrounding the valve be capable of withstanding high internal pressure to avoid sudden undesirable pressure and temperature changes in the steam and also to avoid possible injury to persons in the vicinity of the jacketed valve in the event that the jacket should rupture.

It is therefore a object of this invention to provide an improved, simple, effective and economical jacket construction for fittings such as pipe tees, elbows and valves, for example, in fluid conveying systems, which jacket construction avoids the problems encountered with the prior art, and wherein the improved jacket construction may be readily mounted on and detached from existing fittings without altering the construction of the existing fittings, and which improved jacket construction also obviates the necessity of welding any portions of the jacket construction to the fittings.

It is another object of this invention to provide an improved jacket construction substantially surrounding the body of a fitting of a fluid conveying system and positioned in heat-transferring relation to the fitting for directing a temperature-controlling fluid into heat-transferring relation thereto, and wherein the jacket construction comprises a housing of heat-conductive material which includes inner and outer walls having therebetween at least one fluid passageway provided with inlet and outlet ports for circulation of the temperature-controlling fluid through the passageway.

It is still another object of this invention to provide a jacket construction for a fluid conveying system of the character described wherein the jacket construction comprises a housing which may take the form of a single integral block of heat-conductive material, but which preferably is in the form of a cooperating pair of blocks of heat-conductive material, which blocks preferably are molded or cast, with each of the blocks including inner and outer walls having a fluid passageway therebetween provided with inlet and outlet ports for circulation of a temperature-controlling fluid therethrough, and wherein means are provided for detachably securing the pair of blocks in substantially surrounding relation to the body of the fitting.

Some of the objects of the invention having been stated, other objects will appear as the description proceeds when taken in connection with the accompanying drawings, in which FIG. 1 is a view of a portion of a fluid conveying system illustrating a first embodiment of the improved jacket construction in heat-transferring relation to the body of a fitting or valve, but omitting insulation therefrom;

FIG. 2 is a perspective view of the valve and adjacent fluid flow conduits or pipes shown in FIG. 1, but omitting the improved jacket construction therefrom;

FIG. 3 is a perspective view of a cooperating pair of blocks of the first embodiment of the jacket construction with the blocks removed from the valve body;

FIG. 4 is a left-hand side elevation of the structure shown in FIG. 1, but showing an insulation material in cross-section enclosing the jacket construction and the associated valve;

FIG. 5 is a transverse vertical sectional view taken substantially along line 5—5 in FIG. 4 and particularly illustrating a heat-conductive cement disposed between and filling voids between the proximal surfaces of the jacket blocks and the fitting;

FIG. 13 is a view looking at one end of a cooperating pair of blocks of the jacket construction removed from the pipe fitting or valve and wherein the blocks are secured to the associated valve in a somewhat different manner from that in which the blocks are shown secured to the valve in FIGS. 1 and 4;

FIG. 16 is a partially exploded perspective view of the structure shown in FIG. 15;

FIG. 17 is a somewhat schematic transverse vertical sectional view through the jacket construction and valve of the second embodiment of the invention shown in FIGS. 15 and 16;

FIG. 18 is a view similar to FIG. 15, but illustrating a third embodiment of the invention wherein the jacket housing comprises a single integral block of heat-conductive material;

FIGS. 19 and 20 are views similar to FIGS. 16 and 17, but showing the third embodiment of the jacket construction;

FIG. 27 is a view similar to FIG. 21, but showing a fifth embodiment of the invention in association with a nonflanged or butt-welded type of elbow fitting;

FIG. 28 is a partially exploded perspective view of the structure shown in FIG. 27;

FIG. 29 is a vertical sectional view through the structure shown in FIG. 27, but also showing a layer of insulation material applied thereto; and FIG. 30 is a pespective view of the jacket construction shown in FIG. 27 as it might appear when secured to the corresponding pipe fitting by means of a lagging material wrapped therearound.

Figure 6:
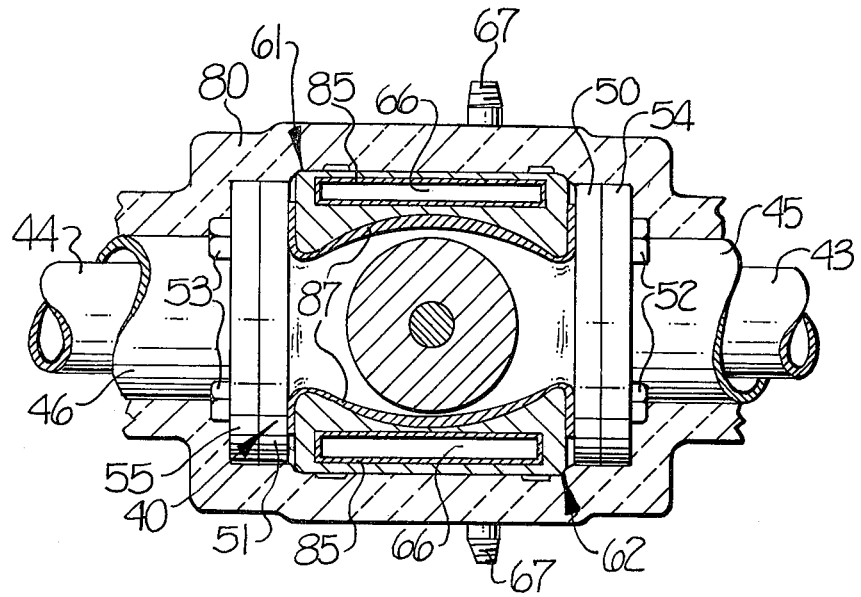
FIG. 6 is an enlarged fragmentary sectional plan view taken substantially along line 6—6 in FIG. 4.

Referring more specifically to the drawings, the first embodiment of the invention is shown in FIGS. 1, 2, 4, 5, 6, 7 and 8 in association with a fluid conveying system including a fitting shown in the form of a flanged control valve 40. Typically, the body 41 of valve 40 is irregular and has a bulbous or rounded lower medial portion opposite from its upper flanged portion 42 (FIG. 2). A processing fluid or a fluid being processed, not shown, flows axially through the body 41 of valve 40 and is conveyed along a pair of flanged conduits or pipes 43, 44 encircled by jacketing tubes 45, 46. Opposite ends of valve body 41 have enlarged flanges 50, 51 integral therewith which are bolted, as by bolts 52, 53 to flanges 54, 55 on the proximal ends of the pipes 43, 44 and the respective jacketing tubes 45, 46. As shown in FIG. 2, portions or heads of bolts 52, 53 project from the proximal surfaces of flanges 50, 51.

It is to be noted that the pipes 43, 44, jacketing tubes 45, 46 and their flanges 54, 55 are representative of typical jacketed pipes employed in conventional jacketed fluid conveying systems. The flanges 54, 55 are generally welded to the pipes 43, 44 and jacketing tubes 45, 46, and it should be noted that the welding can only be effected on the exterior surfaces of the jacketing tubes 45, 46 as they are welded to the respective flanges 54, 55 in encircling relation to the fluid conveying pipes 43, 44.

According to the invention, a jacket construction substantially surrounds the body 41 of valve 40 in heat-transferring relation thereto and cooperates with valve 40 for directing a temperature-controlling fluid into heat-transferring relation thereto. According to this embodiment of the invention, such jacket construction is in the form of a housing broadly designated at 60 which is of heat-conductive material and preferably is molded or cast from an aluminum alloy in this instance. Housing 60 comprises a cooperating pair of generally L-shaped jacket blocks 61, 62 provided with suitable recesses 63 in their upper and opposite end portions to accommodate the heads or nuts of bolts 52, 53 as well as a plurality of bolts 56 in the flanged upper portion 42 of valve 40.

Figures 7, 8:
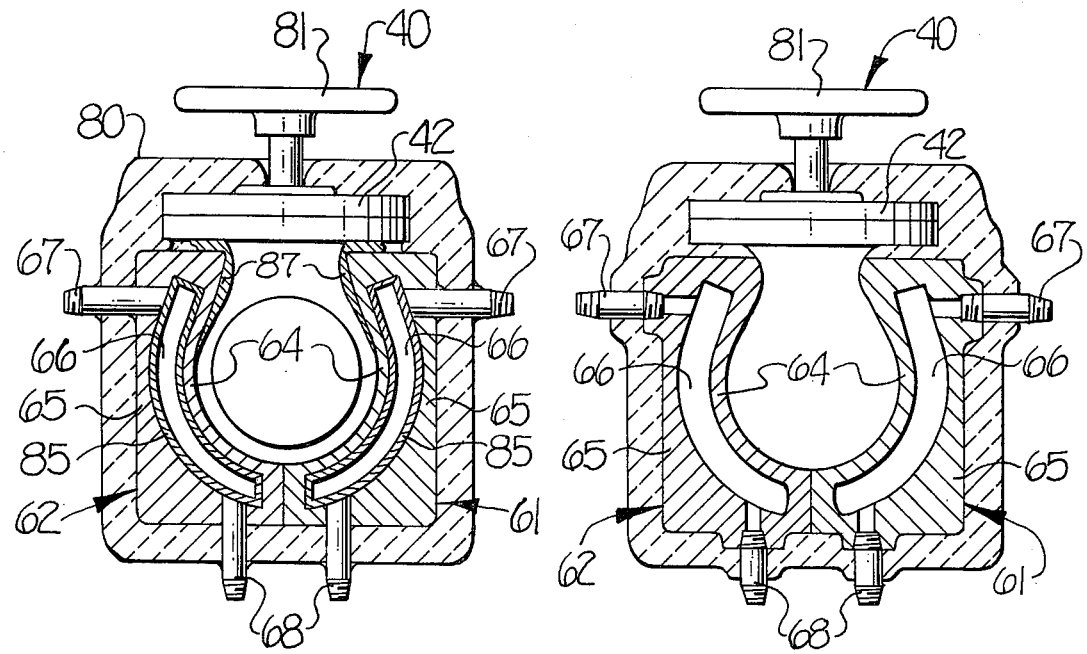
FIG. 7 is an enlarged transverse vertical sectional view similar to FIG. 5.
FIG. 8 is a view similar to FIG. 7, but showing the chambers or passageways for the temperature-controlling fluid as they are defined by the inner and outer walls of the respective blocks, as opposed to the passageways being defined by respective hollow members around which the blocks of the jacket construction are molded in FIG. 7.

The substantially L-shaped cross-sectional configuration of blocks 61, 62 is preferred so that the lower portions of blocks 61, 62 may abut each other as shown in FIGS. 3, 5 and 7 in underlying relation to valve body 41. Also, blocks 61, 62 are collectively of substantially U-shaped cross-section with the upper opposing side portions of the two blocks 61, 62 straddling opposite sides of valve body 41 below the flanged upper portion 42 of valve 40. The length of the two jacket blocks 61, 62 is such that opposite ends thereof are positioned in close proximity to the proximal surfaces of flanges 50, 51 of valve 40, as preferred.

Now, by referring to FIG. 7, it will be apparent that each block 61, 62 includes inner and outer walls 64, 65 having therebetween a downwardly and inwardly curving arcuate fluid passageway 66 provided with inlet and outlet ports 67, 68. These inlet and outlet ports 67, 68 are provided to facilitate circulation of a temperature-controlling fluid through the respective passageways 66. Since the proximal surfaces of the inner walls 64 of the two jacket blocks 61, 62 preferably substantially conform to the shape of the body 41 of valve 40, it follows that the temperature-controlling fluid is directed into heat-transferring relation to the body of valve 40. In this regard it should be noted that the lower portions of blocks 61, 62 are held in abutting relationship and the upper portions thereof are urged toward and into close proximity to, or against, the opposing sides of the body 41 of valve 40 by any suitable means, which is preferably a detachable means, facilitating detachably securing the pair of blocks 61, 62 on body 41 of valve 40. By way of example, it will be observed in FIGS. 1 and 4 that strapping 71 is secured about opposite end portions of blocks 61, 62 for securing the same on body 41 of valve 40.

In order to circulate the aforementioned temperature-controlling fluid through each passageway 66, it will be observed that inlet and outlet ports 67, 68 are in the form of tubular members projecting from blocks 61, 62 and having corresponding ends of conduit means 74, 75 connected thereto, with the opposite ends thereof being communicatively connected to the jacketing tubes 45, 46 for communication with the interiors thereof. Thus, the usual temperature-controlling fluid circulated through tubes 45, 46 also is circulated through the chambers or passageways 66 of the two blocks 61, 62. It should be noted that the temperature-controlling fluid may take various forms depending upon the particular type of fluid being conveyed through the fluid conveying system embodied in the pipes or conduits 43, 44. For example, the temperature-controlling fluid being circulated through the passageways 66 may take the form of steam, oil, water, refrigerant or the like.

After the jacket housing 60 has been assembled with the pipe fitting or valve 40 in the manner described with respect to FIGS. 1–7, a suitable, preferably relatively thick, layer of insulation material 80 preferably is applied to the exterior surfaces of housing 60, valve 40, flanges 50, 51, 54, 55 and jacketing tubes 45, 46 as shown in FIGS. 4–8. Of course, portions of valve 40 may remain exposed, such as the control handle 81 thereof, as may be necessary to facilitate operation of the fluid conveying system.

As heretofore stated, each jacket block 61, 62 is provided with inner and outer walls 64, 65 having therebetween the respective fluid passageway or chamber 66. As shown in FIGS. 5, 6 and 7, each block 61, 62 is provided with a generally arcuate, hollow member or radiator 85 which is preferably formed of relatively thin steel sheet material and defines the respective fluid passageway or chamber 66. It will be observed in FIG. 8, however, that the hollow members or radiators 85 are omitted from the passageways or chambers 66 so that the inner and outer walls 64, 65 per se define the corresponding passageways 66 therebetween.

Figure 9:
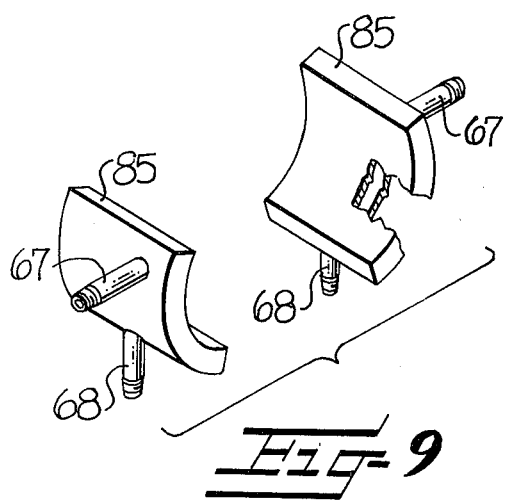
FIG. 9 is a view of the two hollow shell-like members defining the fluid passageways in the cooperating pair of blocks in FIG. 7, but showing them removed from the blocks.

In the case of the arrangement of FIGS. 5, 6 and 7, wherein the radiator or hollow members 85 are employed, the conduit means forming inlet and outlet ports 67, 68 are connected, as by welding, to the outer wall portions of the corresponding hollow members or radiators 85 as is more clearly illustrated in FIG. 9. On the other hand, in the absence of the hollow members or radiators 85, it will be observed in FIG. 8 that the inner ends of the conduits defining the inlet and outlet ports 67, 68 are simply threaded into or otherwise secured to the blocks 61, 62 for communication with the passageways 66.

As heretofore indicated, it is preferred that the jacket blocks 61, 62 are of cast metal. Accordingly, when the hollow members or radiators 85 are employed, as in FIGS. 5, 6 and 7, it is preferred that the cast metal is in the form of an aluminum alloy since it has a very high heat conductivity characteristic. Because of the brittle or frangible nature of the usual types of cast aluminum alloy, it is preferred that radiators 85 are used when the blocks 61, 62 are molded of aluminum alloy. On the other hand, if the blocks 61, 62 are molded of cast steel, which is substantially stronger than cast aluminum, the hollow members 85 may be omitted as in FIg. 8.

Although passageways 66 curve inwardly in FIGS. 5, 7 and 8 and partially underlie the arcuate lower portion of valve body 41 is preferred, the outer portions of blocks 61, 62 preferably are formed with their outer side surfaces extending at about a right angle relative to their bottom surfaces, as shown in FIGS. 5, 7, 8 and 10. This provides thickened reinforced lower outer portions on blocks 61, 62 and permits the use of means other than strapping 71 for securing the blocks on body 41 of valve 40, as will be later described with reference to FIGS. 15–17, for example.

To further enhance the heat-transferring relationship between the valve body 41 and blocks 61, 62, it is preferred that a suitable heat-conductive filler such as heat-conductive cement or heat-conductive grease 87 (FIGS. 5, 6 and 7) is provided between valve body 41 and the jacket blocks 61, 62 so as to fill voids which might otherwise be present between the proximal surfaces of jacket blocks 61, 62 and body 41 of control valve 40. Various formulations of heat--conductive cement and grease for the purpose of enhancing heat transfer are well known in the trade and in the art. Thus, a further description thereof is deemed unnecessary.

Figure 12:
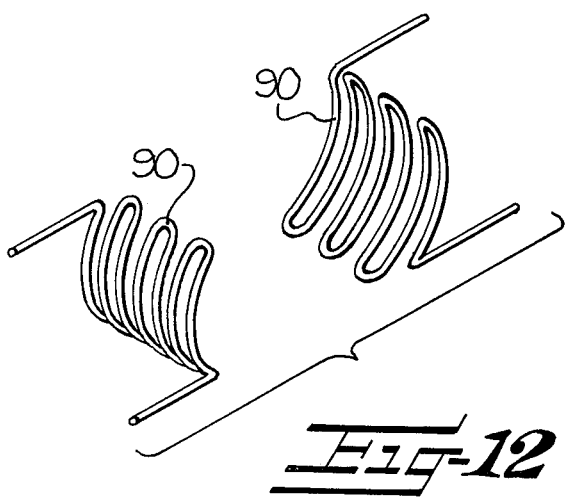
FIG. 12 is a perspective view of two of the serpentine tubular members removed from corresponding blocks of the jacket construction.
Figure 10:
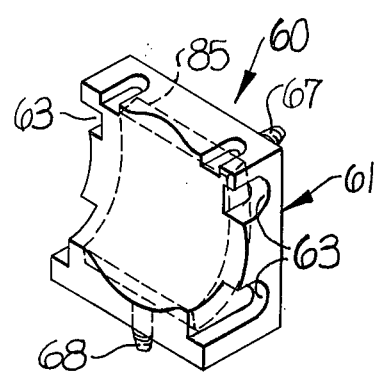
FIG. 10 is a perspective view of one of the blocks of the jacket construction of the first embodiment of the invention with a corresponding hollow shell-like member therein.
Figure 11:
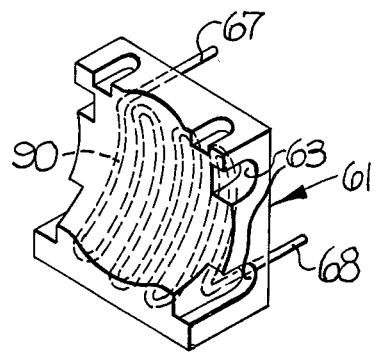
FIG. 11 is a view similar to FIG. 10, but wherein the passageway for the temperature-controlling fluid in the corresponding block is defined by a tubular member of relatively small cross-section arranged in a serpentine manner within the block.

Referring to FIGS. 11 and 12 there is shown a further modification of the first embodiment of the invention wherein only one of the jacket blocks is shown in this instance, namely jacket block 61. However, it is apparent by referring to FIG. 12 that each of the jacket blocks 61, 62 in this modification, is provided with a hollow member in the form of pipe coil 90 which may take the form of a tubular member of relatively small cross-section arranged in a serpentine manner. Each pipe coil 90 defines a corresponding fluid passageway, comparable to the passageway 66 in FIGS. 5–8, for directing a temperature-controlling fluid into heat-transferring relation to the corresponding pipe fitting.

It is apparent, by referring to FIG. 11, that the pipe coils 90 are embedded in the respective jacket blocks 61, 62 so that the inner and outer walls 64, 65 thereof are cast or molded around the pipe coils 90. In this instance, it is to be noted that the opposite ends of pipe coils 90 then will define the inlet and outlet ports for the corresponding passageways in the jacket blocks. Accordingly, a further description of the modification of FIGS. 11 and 12 is deemed unnecessary.

Figure 14:
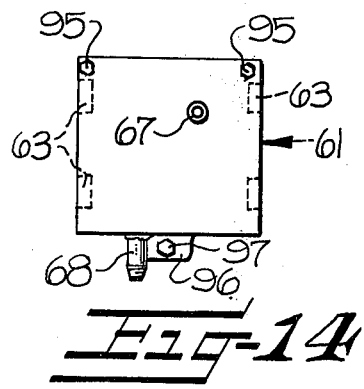
FIG. 14 is a view looking at the right-hand side of FIG. 13.

FIGs. 13 and 14 illustrate a still further modification of the first embodiment of the invention wherein it will be observed that the jacket blocks 61, 62 may be of essentially the same construction in FIGS. 13 and 14 as that described with respect to FIGS. 1–8. However, the blocks 61, 62 shown in FIGS. 13 and 14 differ from the blocks 61, 62 shown in FIGS. 1–8, 10 and 11 in that the upper portions thereof are interconnected by bolts 95 extending through the opposite end portions thereof. Also, the proximal lower portions of blocks 61, 62 in FIGS. 13 and 14 are provided with boss portions 96 thereon penetrated by a common bolt 97 for securing together the lower portions of jacket blocks 61, 62 as modified in FIGS. 13 and 14. In other respects, the jacket blocks 61, 62 as shown in FIGS. 13 and 14 may be identical to the blocks 61, 62 as described with respect to FIGS. 1–7. Accordingly, a further description of the modification of FIGS. 13 and 14 is deemed unnecessary, and those parts shown in FIGS. 13 and 14 will bear the same reference characters as are applied in FIGS. 1–12, where applicable, to avoid redundancy in the description.

Figure 15:
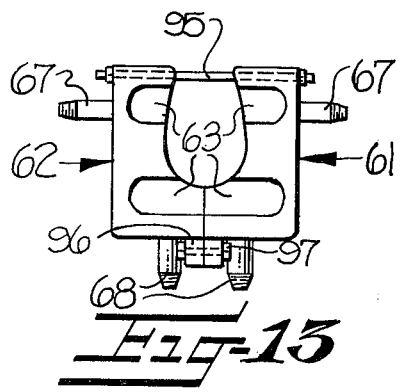
FIG. 15 is a perspective view similar to FIG. 1, showing a second embodiment of the jacket construction in association with a different form of valve from that shown in FIGS. 1, 2 and 4.

The second embodiment of the invention shown in FIGS. 15–17 is quite similar to that shown in the FIGS. 1–7, 9 and 10 with the exception of the fact that the valve 40a there shown has a projecting somewhat cylindrically shaped or cup-like lower body portion, with the jacket blocks being correspondingly modified and provided with curved surfaces to better accommodate the particular form of valve shown in FIGS. 15–17. Also, somewhat different means are provided in FIGS. 15–17 for detachably securing the jacket blocks to the body of the valve in FIGS. 15–17 as compared to the strapping 71 shown in association with the first embodiment of the invention in FIGS. 1 and 4. Accordingly, those parts shown in FIGS. 15–17 which may be similar to parts shown in FIGS. 1–7, 9 and 10 will bear the same reference characters, where applicable, with the letter a added to avoid repetitive description, and only those parts of the structure shown in FIGS. 15–17 which have particular significant differences from similar parts shown in FIGS. 1–7, 9 and 10 will be described in detail.

By comparing the control valve 40 as shown in FIGS. 2, 5, 6 and 7 with the control valve 40a shown in FIGS. 15–17, it will be noted that a medial upper portion of the body 41 of valve 40 in FIGS. 2, 5 and 7 is relatively narrow as compared to the bulbous lower portion of body 41. On the other hand, the medial portion of the body 41a of valve 40a in FIGS. 15–17 may be somewhat wider at its upper portion than at its lower portion, and, additionally a medial portion of valve body 41a is generally cup-shaped and its lower portion has relatively small lateral projections 41a' on opposite sides thereof.

Referring to FIG. 7, it will be observed that the proximal surfaces of the inner walls of the blocks 61, 62 of the first embodiment have a downwardly and inwardly curving configuration, with the passageways 66 and the hollow members 85 defining the same being of generally arcuate cross-section and also curving downwardly and inwardly generally parallel to the central portion of the proximal surfaces of the blocks 61, 62. However, it will be observed in FIGS. 16 and 17 that the proximal surfaces of the inner walls of the jacket blocks 61a, 62a of housing 60a are generally cup-shaped for receiving therein the cup-shaped medial portion of the body 41a of valve 40a. Additionally, the irregular proximal lower portions of the walls of jacket blocks 61a, 62a, are provided with small recesses 64a' therein adapted to receive therein the projections 41a' on the opposite sides of the cup-shaped medial portion of the body 41a of valve 40a when blocks 61a, 62a are secured to body 41a as in FIGS. 15 and 17.

It is apparent, that since the lower surface of the cup-shaped medial portion of valve body 41a extends at substantially right angle to the medial sidewall portions of valve body 41a, the medial portions of blocks 61a, 62a also extend at substantially right angles with respect to the lower portions thereof although both the blocks 61, 62 and the blocks 61a, 62a are of generally L-shaped cross-sectional configuration. Accordingly, instead of the passageways or chambers 66a of FIG. 17 being curved in the manner of the chambers 66 in FIG. 7, for example, the passageways 66a and the corresponding hollow members 85a (FIG. 17) are substantially L-shaped in cross-section.

The housing 60a of the jacket construction of FIGS. 15–17 also differs from the housing 60 of FIGS. 1–8 in that, instead of utilizing strapping, such as the straps 71 of FIG. 1, for detachably securing the jacket blocks to the corresponding valve body, it will be observed in FIG. 16 that opposite ends of a pair of lower connecting rods or links 92 are removably secured to the lower surfaces of jacket blocks 61a, 62a by respective pairs of removable fastening means or screws 93 so that links 92 bridge and interconnect blocks 61a, 62a. Screws 93 may be threadedly embedded in blocks 61a, 62a. Additionally, opposite side portions of the upper surfaces of blocks 61a, 62a are interconnected by a pair of extensibly adjustable links 95, opposite ends of which are secured to blocks 61a, 62a by respective screws 96 threaded into blocks 61a, 62a. The effective lengths of the links 95 may be adjusted, to facilitate clamping the upper proximal portions of blocks 61a, 62a against opposite sides of the body 41a of valve 40a, by suitable adjustment screws 97.

In other respects, the structure shown in FIGS. 15–17 may be similar to that described with respect to FIGS. 1–12 and, accordingly, a further description of the structure of FIGS. 15–17 is deemed unnecessary.

Referring now to FIGS. 18–20, there will be observed a third embodiment of the invention shown as a modification of the structure shown in FIGS. 15–17 in that the housing 60b of this jacket construction is formed of a single substantially U-shaped block which matingly receives the body of the corresponding valve therein. In this instance, the valve shown in FIGS. 18–20 may be identical to the valve 40a shown in FIGS. 15–17. Accordingly, those parts of the valve shown in FIGS. 18–20 which correspond to similar or like parts of valve 40a shown in FIGS. 15–17 will bear the same reference characters with the letter b substituted for the letter a, where applicable, to avoid repetitive description.

The jacket construction of FIGS. 18–20 comprises a substantially U-shaped housing 60b in the form of a single integral block 100 cast or molded from a suitable heat-conductive material. As heretofore indicated, the jacket block 100 is of substantially U-shaped cross-section and, thus, block 100 includes opposing leg portions 101, 102 and foot portions which are integral with each other at their lower portions. Otherwise, leg portions 101, 102 are of substantially the same configuration as the proximal surfaces of blocks 61a, 62a of FIG. 16.

Instead of the proximal portions of the leg portions 101, 102 being provided with relatively small recesses therein corresponding to the recesses 64a' of FIG. 16, the proximal surfaces of the leg portions 101, 102 are provided with vertically extending elongate recesses or grooves 103, only one of which is shown in FIG. 19. additionally, opposite ends of the leg portions 101, 102 of jacket block 100 are provided with vertically extending grooves 104 therein adapted to be aligned with the bolts 53b which secure the flanges of valve 40b to adjacent conduits or pipes of the fluid conveying system. The recesses or grooves 103, 105 are open at their upper ends. Thus, in order to assemble block 100 with valve 40b, block 100 is positioned below body 41b and then moved upwardly relative to valve 40b and between flanges 50b, 51b thereof with the grooves 105 in registration with the corresponding bolts 53b and with the grooves 103 in registration with the projections 41b'. A pair of links 106 are then secured to the upper ends of the leg portions 101, 102 of the jacket block 100, by means of screws 107 (FIG. 19), and the links 106 may simply rest upon adjacent portions of the body 41b of valve 40b to position block 100 in the desired substantially surrounding relation to valve body 41b.

It will be observed in FIG. 20 that block 100 is provided with a generally U-shaped chamber or passageway 112 located between the inner and outer walls of jacket block 100, and which passageway extends along the lower bridging portion of the substantially U-shaped jacket block 100 as well as extending upwardly along both of the leg portions 101, 102 of block 100. Thus, passageway 112 extends beneath and along opposite sides of valve body 41b. Passageway 112 is provided with inlet and outlet ports 113, 114 for circulation of temperature-controlling fluid through passageway 112. If desired, block 100 may be molded or cast around a hollow member or radiator, not shown, whose sheet metal walls will then define the passageway or chamber 112 in the jacket body 100. On the other hand, it is to be noted that the radiators or hollow members 85a of FIG. 17 also may be omitted, if desired.

Referring again to FIG. 20, it will be observed that, since grooves 103 extend throughout a major portion of the length or height of each leg portion 101, 102 of jacket block 100, a heat-conductive filler 115 may be positioned between and fill the voids between the proximal surfaces of leg portions 101, 102 and the body 41b of control valve 40b. In other respects, the jacket construction of FIGS. 18-20 may be essentially the same as the jacket construction of FIGS. 15-17 and, therefore, a further description thereof is deemed unnecessary.

Figure 21:
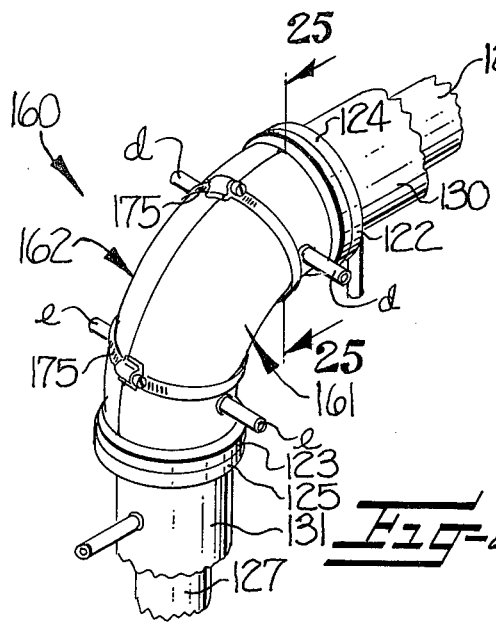
FIG. 21 is a perspective view of a fourth embodiment of the invention wherein the jacket construction is embodied in a housing having a cooperating pair of blocks curved along their lengths and positioned in heat-transferring relation to a fitting in the form of a flanged elbow, but omitting the insulation material.
Figure 23:
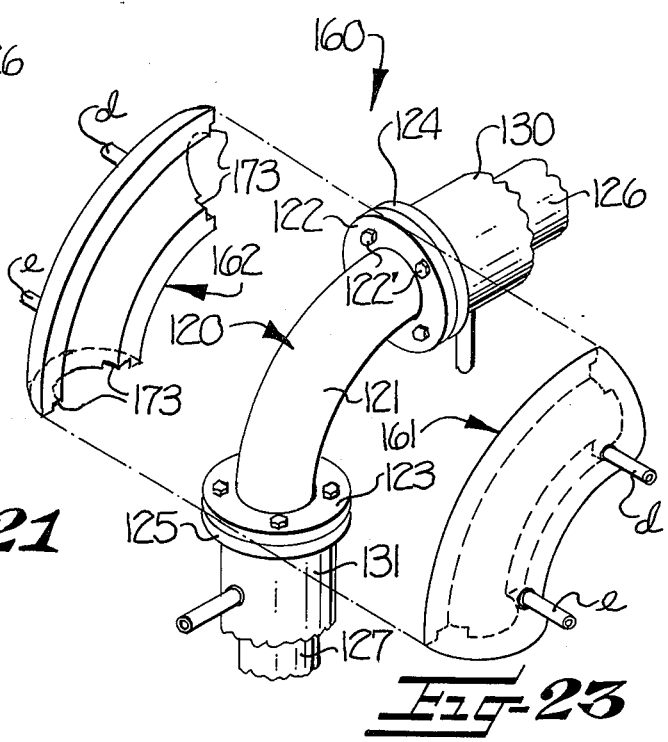
FIG. 23 is a partially exploded view of the structure shown in FIG. 21.

As heretofore indicated, the principles of this invention are applicable to various types of fittings. As a further illustration of this concept, there will be observed in FIGS. 21-26 a fourth embodiment of the jacket construction of this invention as applied to a pipe fitting which takes the form of an elbow interposed in a fluid conveying system. As shown in FIGS. 21 and 23, the elbow is generally designated at 120 and has a body 121 which is curved throughout the length thereof and has flanges 122, 123 on opposite ends thereof.

The flanges 122, 123 are secured to the proximal end flanges 124, 125 of fluid conveying conduits or pipes 126, 127 which, like the pipes 43, 44 of FIG. 2, have jacketing tubes 130, 131 therearound with the corresponding ends of the jacketing tubes 130, 131 being connected to the flanges 124, 125. Further, as shown in FIGS. 21, 23, 25 and 26, the housing for the elbow 120 is broadly designated at 160 and includes a cooperating pair of curved jacket blocks 161, 162 which are of heat-conductive material and preferably are of molded or cast construction.

Figure 22:
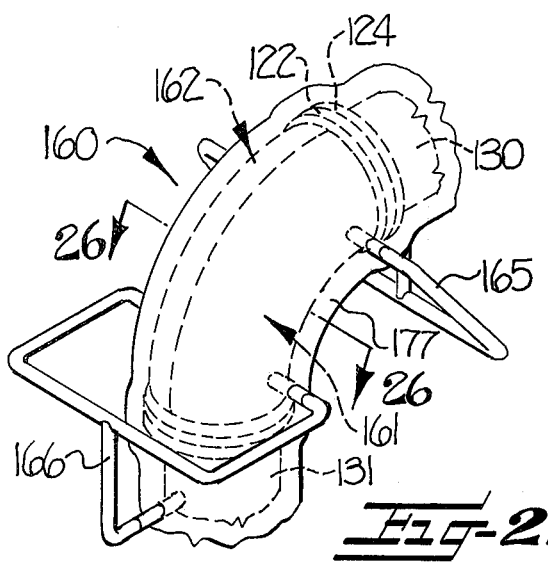
FIG. 22 is a view similar to FIG. 21, but showing the jacket construction after a layer of insulation material has been applied thereto.

Each jacket block 161, 162 is substantially C-shaped in cross-section and includes inner and outer walls a, b (FIG. 26) having therebetween a fluid passageway of chamber c provided with inlet and outlet ports d, e for circulation of temperature-controlling fluid through each respective passageway c. The inlet and outlet ports d, e are communicatively connected, as by conduit means 165, 166, to the respective jacketing tubes 130, 131, as best shown in FIG. 22. Thus, the temperature-controlling fluid being circulated through the jackets defined by the jacketing tubes 130, 131 also is circulated through the passageways c of the jacket blocks 161, 162.

Figure 24:
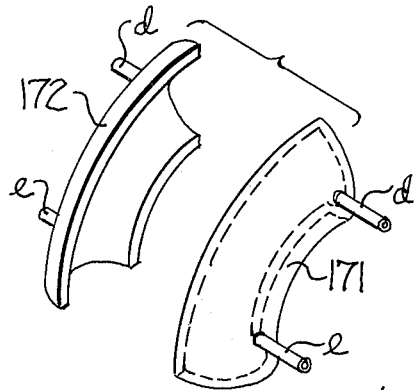
FIG. 24 is a perspective view of the hollow passageway-defining members employed with the cooperating pair of jacket blocks shown in FIGS. 21 and 23.
Figure 25:
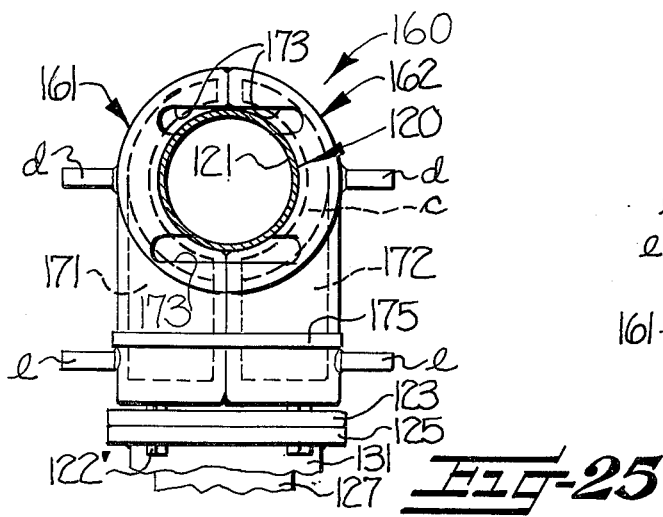
FIG. 25 is an enlarged fragmentary view taken substantially along line 25—25 in FIG. 21.
Figure 26:
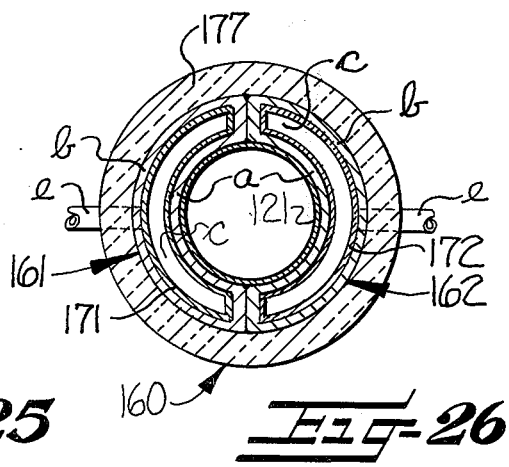
FIG. 26 is an enlarged fragmentary sectional view taken substantially along line 26—26 in FIG. 22.

As shown in FIGS. 24 and 26, jacket blocks 161, 162 are of hollow construction and have respective hollow members or radiators 171, 172 of relatively thin material therein, such as sheet steel, which defines the respective fluid passageways c. The hollow members 171, 172 preferably are of a curvature corresponding substantially to the curvature of jacket blocks 161, 162. As shown in FIG. 23, the jacket blocks 161, 162 are each of substantially semicircular cross-sectional configuration and are of arcuate form throughout the axial lengths thereof, with opposite ends of the jacket blocks 161, 162 being adapted to fit closely adjacent the flanges 122, 123. Accordingly, opposite ends of jacket blocks 161, 162 are provided with lateral grooves 173 therein (FIG. 23) to accommodate the bolts 122' which secure the flanges 122, 123 to the flanges 124, 125.

It will be noted that the separation line defined at the junctures of the two jacket blocks 161, 162 extends in a radial direction so that the blocks 161, 162 are positioned on opposite sides of the body 121 of pipe elbow 120 as opposed to being beneath and above, the body of pipe elbow 120. The curved jacket blocks 161, 162 may be secured around the body 121 of pipe elbow 120 and in abutting relation with each other, as by means of adjustable strap members or clamps 175 as shown in FIG. 21.

As shown in FIG. 22, after jacket blocks 161, 162 are secured to the body 121 of elbow 120, and after the inlets and outlets d, e have been communicatively connected to jacketing tubes 130, 131 of the adjacent pipes 126, 127, the housing 160, flanges 122-125 and adjacent portions of the jacketing tubes 130, 131 are covered with a layer of insulation material 177 to complete the installation of the jacket construction of FIGS. 21-26.

Referring now to FIGS. 27-29, there will be observed a jacket construction comprising a housing 160a which may be used for cooperating with a non-flanged or butt-welded elbow 120a. The structure shown in FIGS. 27, 28 and 29 may be substantially the same as the structure shown in FIGS. 21, 22, 23, 25 and 26, with the exception that the cooperating pair of jacket blocks are so formed that the junctures thereof extend transversely of a radial plane extending through the axis of the curved pipe elbow 120a, and the passageways in the jacket blocks are defined by the inner and outer walls per se in FIG. 29 as opposed to being defined by a hollow body or radiator positioned within the respective blocks. Therefore, the various parts shown in FIGS. 27-29 which correspond to like or similar parts in FIGS. 21-26 will bear the same reference characters with the letter a added, where applicable, to avoid repetitive description.

As heretofore indicated, the jacket blocks of FIGS. 27-29 are so constructed that they are disposed one above the other as opposed to being disposed in side-by-side relation as is the case with respect to the jacket blocks 161, 162 in FIG. 21. Therefore, the jacket blocks are shown in FIGS. 27-29 in the form of an upper jacket block 161a and a lower jacket block 162a. Each of the jacket blocks 161a, 162a includes inner and outer walls a', b' (FIG. 29) having therebetween a fluid passageway c' provided with inlet and outlet ports d' e'. The blocks 161a, 162a are formed of a heat-conductive material and preferably are formed of molded or cast steel with the passageways or chambers c' being formed therein and defined by the inner and outer walls a', b' per se of blocks 161a, 162a.

As best shown in FIG. 28, the proximal edges of blocks 161a, 162a may be of substantially the same radius and substantially the same length, but the outer radius of block 161a is substantially greater than the inner radius thereof while the outer radius of block 162a is substantially smaller than the inner radius thereof so that the block 161a may be positioned against the outer surface of the body 121 of elbow 120a, and the block 162a may be positioned against the inner surface of the body 121a of elbow 120a. In other respects, the structure shown in FIGS. 27–29 may be substantially the same as that shown in FIGS. 21–26 and, thereof, a further description thereof is deemed unnecessary.

Referring to FIG. 30, the jacket construction there shown may be identical to that shown in FIGS. 21–26 or FIGS. 27–29 with the exception that a lagging material 177b is wrapped around the jacket housing and adjacent parts of the fluid conveying system. Accordingly details of the jacket construction are not shown in FIG. 30, and the elements there shown include jacketing tubes 130b, 131b, housing 160b and its curved blocks 161b, 162b. As shown, the elements 130b, 131b, 160b, 161b, 162b correspond to the respective elements 130a, 131a, 160a, 161a, 162a of FIGS. 27–28 and need not be further described.

However, instead of the jacket housing 160b being secured on the corresponding elbow by strap members corresponding to the strap members 175a of FIG. 27, the jacket housing 160b is secured on the corresponding elbow by means of the lagging material. Since pipe lagging materials are well-known in the art, a further description thereof is deemed unnecessary.

It is thus seen that I have provided several forms of an improved jacket construction to aid in maintaining at a desired temperature a fluid flowing through a fitting in a fluid conveying system and wherein the jacket construction is simple and may be readily installed on existing fittings even though the existing fittings may already be installed in a fluid conveying system. Further, the jacket construction may be readily removed from a fitting at any time, if desired, to permit repairing or replacing a fitting or performance of any other corrective work which may be desired in connection therewith, after which the jacket construction may be reinstalled on the corresponding fitting.

In the drawings and specification there have been set forth preferred embodiments of the invention and, although specific terms are employed, they are used in a generic and descriptive sense only and not for purposes of limitation.

That which is claimed is:

1. In a fluid conveying system including a fitting having a body through which a fluid flows, the combination therewith of means substantially surrounding the body of said fitting in close conformity and in heat-transferring relation thereto and cooperating with the fitting for directing a temperature-controlling fluid into heat-transferring relation thereto, said means comprising a housing including a cooperating pair of cast blocks of heat-conductive material, each block being substantially L-shaped in cross-section with the pair of blocks collectively being substantially U-shaped in cross-section, each block including inner and outer walls having therebetween a fluid passageway extending beneath and alongside the body of said fitting and provided with inlet and outlet ports for circulation of the temperature-controlling fluid through the passageway, a hollow member of relatively thin heat conductive material embedded within each cast block and surrounded by the block and defining said fluid passagway therein, and means carried by said pair of blocks for positioning the same in predetermined relation to each other and in substantially surrounding relation to the body of said fitting.

2. In a fluid conveying system including a valve having an irregularly shaped body through which a fluid flows, the combination therewith of means substantially surrounding the body of said valve in close conformity and in heat-transferring relation thereto and cooperating with the valve for directing a temperature-controlling fluid into heat-transferring relation thereto, said means comprising a housing including a cooperating pair of cast blocks of heat-conductive material having respective inner faces substantially conforming to respective opposite sides of said irregularly shaped body of said valve, each block including inner and outer walls having therebetween a fluid passageway extending beneath and alongside the body of said valve and provided with inlet and outlet ports for circulation of the temperature-controlling fluid through the passageway, a hollow member of relatively thin heat conductive material embedded within each cast block and surrounded by the block and defining said fluid passageway therein, and means carried by said pair of blocks for positioning the same in predetermined relation to each other and in substantially surrounding relation to the body of said valve.

3. A structure according to claim 2 wherein said body of the valve has axially spaced end flanges thereon and bolts extending through said end flanges and connecting the same to an adjacent pair of fluid flow conduits, and wherein opposite ends of said blocks are provided with recesses therein for receiving the heads of the bolts extending through the end flanges of said valve so that the blocks are positioned to extend substantially the entire length of the body of said valve.

4. In a fluid conveying system including a valve having an irregularly shaped body through which a fluid flows, the combination therewith of means substantially surrounding the body of said valve in close conformity and in heat-transferring relation thereto and cooperating with the valve for directing a temperature-controlling fluid into heat-transferring relation thereto, said means comprising a housing including a cooperating pair of cast blocks of aluminum alloy material having respective inner faces substantially conforming to respective opposite sides of said irregularly shaped body of said valve, each block including inner and outer walls having therebetween a fluid passageway extending beneath and alongside the body of said valve and provide with inlet and outlet ports for circulation of the temperature-controlling fluid through the passageway, a hollow member of relatively thin steel sheet material embedded within each cast block and surrounded by the block and defining said fluid passageway therein, means carried by said pair of blocks for positioning the same in predetermined relation to each other and in substantially surrounding relation to the body of said valve, and a layer of insulation material substantially enclosing said pair of blocks and the valve therein.

* * * * *

UNITED STATES PATENT OFFICE
CERTIFICATE OF CORRECTION

PATENT NO. : 3,901,269
DATED : August 26, 1975
INVENTOR(S) : James R. Henderson

It is certified that error appears in the above-identified patent and that said Letters Patent are hereby corrected as shown below:

Column 10, Line 24, after "above," insert --respectively--
Column 12, CLAIM 4, Line 57, "provide" should be --provided--

Signed and Sealed this twenty-fifth Day of November 1975

[SEAL]

Attest:

RUTH C. MASON
Attesting Officer

C. MARSHALL DANN
Commissioner of Patents and Trademarks